(12) United States Patent
Brand (10) Patent No.: US 7,475,027 B2
(45) Date of Patent: Jan. 6, 2009

(54) ON-LINE RECOMMENDER SYSTEM (75) Inventor: Matthew E. Brand, Newton, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 1320 days.

(21) Appl. No.: 10/361,165

(22) Filed: Feb. 6, 2003

(65) Prior Publication Data

US 2004/0158497 A1 Aug. 12, 2004

(51) Int. Cl.
*G06Q 30/00* (2006.01)
*G06F 17/30* (2006.01)
*G06F 15/16* (2006.01)
*G06F 7/00* (2006.01)
*G07G 1/00* (2006.01)

(52) U.S. Cl. .................. 705/26; 705/10; 709/232; 707/7

(58) Field of Classification Search .................. None
See application file for complete search history.

(56) References Cited

U.S. PATENT DOCUMENTS

| | | | | |
|---|---|---|---|---|
| 5,583,763 A | * | 12/1996 | Atcheson et al. | 707/3 |
| 5,749,081 A | * | 5/1998 | Whiteis | 707/102 |
| 5,983,251 A | * | 11/1999 | Martens et al. | 708/203 |
| 6,041,311 A | * | 3/2000 | Chislenko et al. | 705/27 |
| 6,092,049 A | * | 7/2000 | Chislenko et al. | 705/10 |
| 6,314,419 B1 | * | 11/2001 | Faisal | 707/2 |
| 6,412,012 B1 | * | 6/2002 | Bieganski et al. | 709/232 |
| 6,636,836 B1 | * | 10/2003 | Pyo | 705/26 |
| 6,965,898 B2 | * | 11/2005 | Aono et al. | 707/101 |
| 7,043,312 B1 | * | 5/2006 | Moorer | 700/94 |
| 7,359,550 B2 | * | 4/2008 | Brand | 382/181 |
| 2002/0161664 A1 | * | 10/2002 | Shaya et al. | 705/26 |
| 2003/0088871 A1 | * | 5/2003 | Kimura | 725/46 |
| 2003/0159106 A1 | * | 8/2003 | Aono et al. | 715/500 |
| 2003/0200097 A1 | * | 10/2003 | Brand | 704/500 |
| 2004/0034652 A1 | * | 2/2004 | Hofmann et al. | 707/102 |
| 2004/0076936 A1 | * | 4/2004 | Horvitz et al. | 434/236 |
| 2006/0026642 A1 | * | 2/2006 | Schaffer et al. | 725/46 |

OTHER PUBLICATIONS

"Learning collaborative information filters" by Billsus, D.; Pazzani, M.J., Morgan Kaufmann Publishers, San Francisco, CA, USA; Jul. 24-27, 1998.*

"Application of dimensionality reduction in recommender system—a case study," *ACM WebKDD 2000 Web Mining for Ecommerce Workshop*. ACM Press, 2000.

"Large Scale Sparse Singular Value Computations," Michael W. Berry.

(Continued)

*Primary Examiner*—F. Zeender
*Assistant Examiner*—Mussa Shaawat
(74) *Attorney, Agent, or Firm*—Dirk Brinkman; Gene Vinakur (57) ABSTRACT

A method and system recommends items such as products and services to consumers. Rating on items are received from consumers as a sequential stream of data. A thin singular value decomposition is updated, one rating at the time, while receiving the ratings. A prediction of a recommendations of particular items for a particular consumer is based on the updated singular value decomposition while receiving the ratings and updating the singular value decomposition. The ratings are discarded after the updating so that a size, structure, and content of an underlying preference matrix is unknown.

16 Claims, 6 Drawing Sheets

OTHER PUBLICATIONS

"An Eigenspace Update Algorithm for Image Analysis," Chandrasekaran et. al. University of California, Santa Barbara, CA. 1997.

"Sequential Karhunen—Loeve Basis Extraction and its Application to Images," Levy et al. IEEE Transactions on Image Processing, vol. 9, No. 8, Aug. 2000.

"On Updating Problems In Latent Semantic Indexing," Hongyuan Zha, Horst D. Simon.

"An Updating Algorithm for Subspace Tracking," G.W. Stewart, Department of Computer Science and Institute for Advanced Computer Studies, University of Maryland, College Park, MD., UMIACS-TR-90-86, Jul. 1990; CS-TR 2494, Revised Jan. 1991.

* cited by examiner

ON-LINE RECOMMENDER SYSTEM

FIELD OF THE INVENTION

This invention relates generally to consumer recommender systems, and more particularly to revising preferences in such systems.

BACKGROUND OF THE INVENTION

Figure 1:
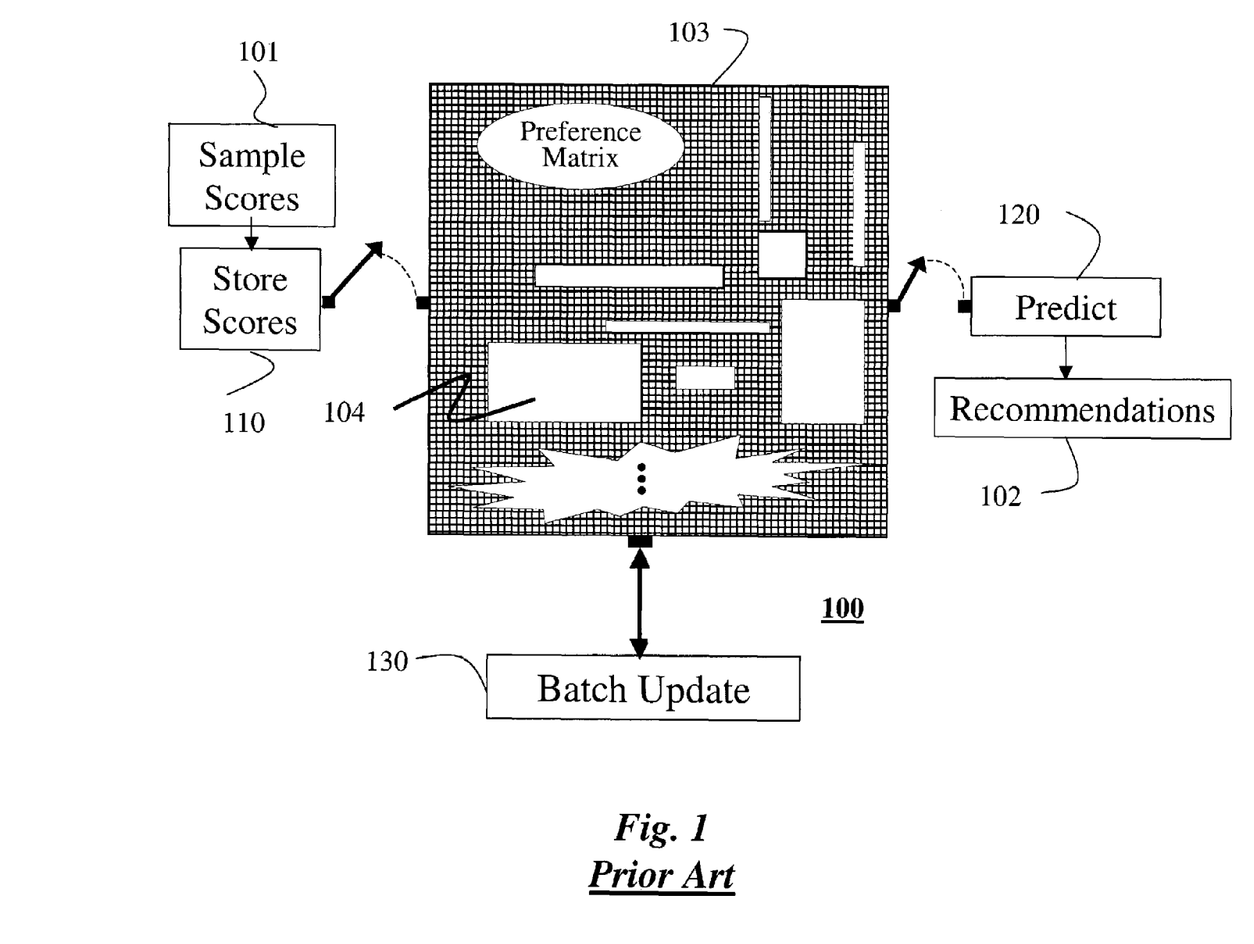
FIG. 1 is a block diagram of a prior art recommender system.

As shown in FIG. 1, consumers use a recommender system 100 to find certain items, e.g., products and services, that they might prefer over others. With a prediction function, the recommender system generally uses the ratings 101 of preferences on items made by other consumers to predict 120 recommendations 102, i.e., likes and dislikes, over a much larger set of items. This data processing application is also known as collaborative filtering.

The prediction function uses a tabular database, i.e., a preference matrix 103, of stored 110 customer-scores 101 to make recommendations. For example, consumers score items such as movies and books. It is not unusual for the number of entries in the table 103 to be enormous, e.g., $10^3$ rows of items and $10^7$ columns of consumers. Generally, most entries 104 in the table 103 are empty with unknown scores, i.e., unrated items. Hence, the table is "sparse."

In an operational recommender system, the entries in the table 103 need to be revised, with rows, columns, and individual scores constantly being added, edited, or retracted as consumer indicate their preferences. These revisions can arrive asynchronously from many distributed sources at a very high rate. For example, movie rating evolve rapidly over a very short time, perhaps a day as a new movie is released.

Efficient methods for storing, updating, and accessing preference tables are sought constantly. Estimating a reasonably efficient, compact, and accurate prediction function is an even harder problem that has attracted much attention in the fields of data mining and machine learning.

Nearest-neighbor search methods, which effectively match against raw data, remain popular despite high search costs and limited predictivity. More sophisticated prediction methods are often defeated by the very high dimensionality of the data, high computational costs of model fitting, and an inability to adapt to new or retracted data. Moreover, with extremely sparse tables, the data are often insufficient to support accurate parameter estimates of those methods.

Typically, a dense subset of the table is constructed using responses of a focus group, and the prediction function is extrapolated from those responses. The very high dimensionality of the problem has partly motivated explorations of multi-linear models such as a singular value decomposition (SVD), both as a compressed representation of the data, and as a basis for predictions via linear regression. Linear regression models generally have lower sample complexity per parameter than non-linear models and can thus be expected to have better generalization.

The SVD and related eigenvalue decomposition (EVD) lie at the heart of many data analysis methods. They are used for dimensionality reduction, noise suppression, clustering, factoring, and model-fitting. Several well-known recommender systems are based on the SVD.

Unfortunately, determining the SVD of a very large matrix is a treacherous affair. Most prior art recommender systems need to be taken off-line, as shown in FIG. 1, while the preference table 103 and SVD are updated by a batch process 130. The decomposition has a quadratic run-time, in terms of the size of the matrix 103. Therefore, this is typically done at night. As a result, when the preferences are evolving rapidly during the day, accurate predictions may not be available until a day later.

In addition, the traditional SVD does not produce uniquely defined results when there are missing values 104, as is the case in most recommender systems. Adapting to new or retracted data is also an issue, though it is well known how to append or retract entire columns or rows, provided that they are complete. This is not the case when the data arrive in fragments of rows and columns.

Updating 30 the SVD is generally based on Lanczos methods, symmetric eigenvalue perturbations, or relationships between the SVD and the QR-decomposition, e.g., as computed by a modified Gram-Schmidt procedure. The last category includes some very fast methods, but is vulnerable to loss of orthogonality.

For example, the left singular vectors can be determined in $O(pqr^2)$ time. If p, q, and r are known in advance and $p \gg q \gg r$, then the expected complexity falls to $O(pqr)$. However, the precision of the orthogonality is not preserved, and satisfactory results have only been demonstrated for matrices having a few hundred columns, which is too small for practical applications.

The prior art does not consider missing values 104, except insofar as they are treated as zero values. In the batch-SVD update context, missing values are usually handled via subspace imputation, using a computationally expensive expectation-maximization procedure.

First, an SVD of all complete columns is performed. Next, incomplete columns are regressed against the SVD to estimate missing values. Then, the completed data are refactored and re-imputed until a fixed point is reached.

This is an extremely slow process that operates in quadratic time and only works when very few values are missing. It has the further demerit that the imputation does not minimize effective rank. Other heuristics simply fill missing values with row- or column-means.

In the special case where a preference matrix is nearly dense, its normalized scatter matrix may be fully dense, due to fill-ins. One heuristic interprets the eigenvectors of the scatter matrix as the right singular vectors of the scatter matrix. This is strictly incorrect. There may not be any imputation of the missing values that is consistent with eigenvectors of the scatter matrix. For the very sparse problems, as considered by the invention, this objection is mooted by the fact that the scatter matrix is also incomplete, and its eigenvectors are undefined.

Therefore, there is a need to provide a method for revising preferences in a recommender system with incomplete data in an on-line manner.

SUMMARY OF THE INVENTION

The invention provides a class of sequential update rules for adding data to a "thin" SVD, revising or removing data already incorporated into the SVD, and adjusting the SVD when the data-generating process exhibits non-stationarity, e.g., when market dynamics drift or when consumers' tastes change.

The method according to the invention handles data streams of consumer-item ratings, where scoring fragments arrive in random order and individual scores are arbitrarily added, revised, or retracted at any time.

These purely on-line rules have very low time complexity and require caching for only a single consumer's ratings. All operations easily fit in a CPU's on-board memory cache, even for very large data-sets. By identifying the singular vectors and values with a data covariance, the invention obtains an imputative update that selects the most probable completion of incomplete data, leading to low-rank SVDs that have superior predictive power when compared with the prior art.

Recommending, i.e., imputation of missing values, is extremely fast. The system can be used in a fully interactive movie recommender application that predicts and displays ratings of thousands of movie titles in real-time as a consumer modifies ratings of a small arbitrary set of probe movies. With the invention, my thin SVD itself is the consumer preference model, instead of some large, yet sparse, underlying preference matrix 103, as in the prior art.

The system "learns" as it is used by revising the SVD based on consumer ratings. Consumers can asynchronously join, add ratings, add movies, revise ratings, get recommendations, and retract themselves from the model.

DETAILED DESCRIPTION OF THE PREFERRED EMBODIMENT

System Overview

Figure 2:
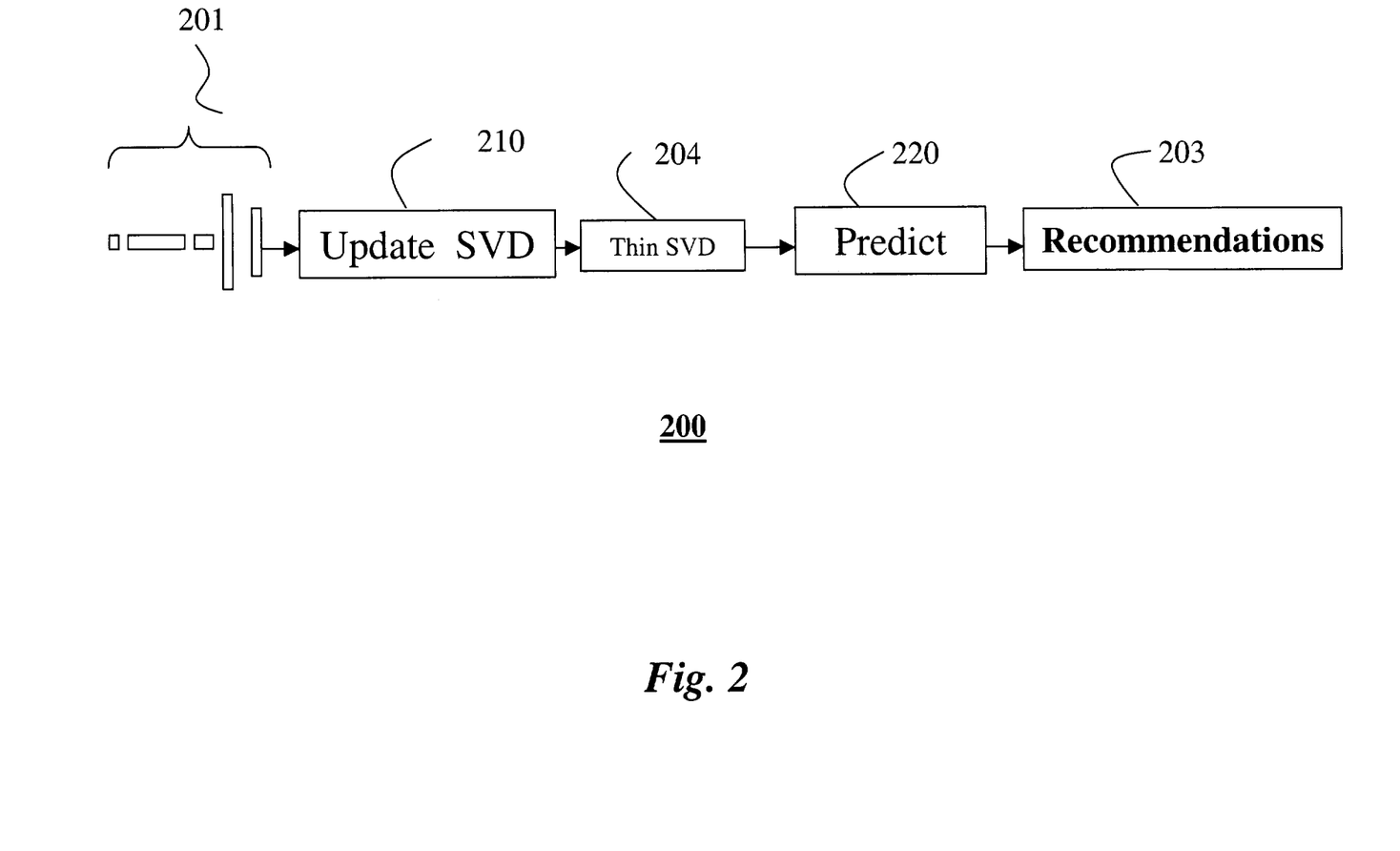
FIG. 2 is a block diagram of a recommender system according to the invention.

FIG. 2 shows the overall context of an on-line system and method 200 for revising consumer preferences according to my invention. The system performs what is known in the art as collaborative filtering.

In no particular order perhaps, random, preference scores are received asynchronously as fragments of ratings 201. Each rating is processed, one at the time, independent of any other ratings, as described below.

The rating fragments are used to update 210, i.e., add, change or retracted a "thin" SVD 204, in any order. After each rating have been consumed into the SVD, it can be discarded, so that the ultimate size, structure and content of an underlying preference matrix unknown. In fact, my invention does not need to compute or store the underlying matrix, as is done in the prior art.

My task is to determine a best running estimate of the rank-r SVD 204 of the underlying data matrix, without actually any storing or caching of the fragments of the ratings 201 or the matrix itself, and to predict 220 recommendations 203 of particular items for particular consumers, only from the thin SVD 204, on demand, while receiving ratings and updating the SVD. Initially, the SVD 204 can be empty, or a null SVD. An optional step to "bootstrap" the SVD is described below.

To this end, I provide a set of rank-1 sequential update rules for the SVD 104. The update rules provide very fast additions, retractions, and element-wise edits, fast enough for linear-time construction of the SVD 104. The update is exact, but the SVD 104 is an estimate, because many entries are unknown. In other words, the underlying matrix is extremely sparse.

In addition, the true preference matrix may have a rank greater than r. In this case, the Gauss-Mark theorem gives a least-squares optimality guarantee for the rank-r approximation.

When faced with missing data, I use an imputative update that maximizes the probability of a correct generalization. My method is much faster, and at least as predictive as prior art off-line batch SVD methods.

Figure 5:
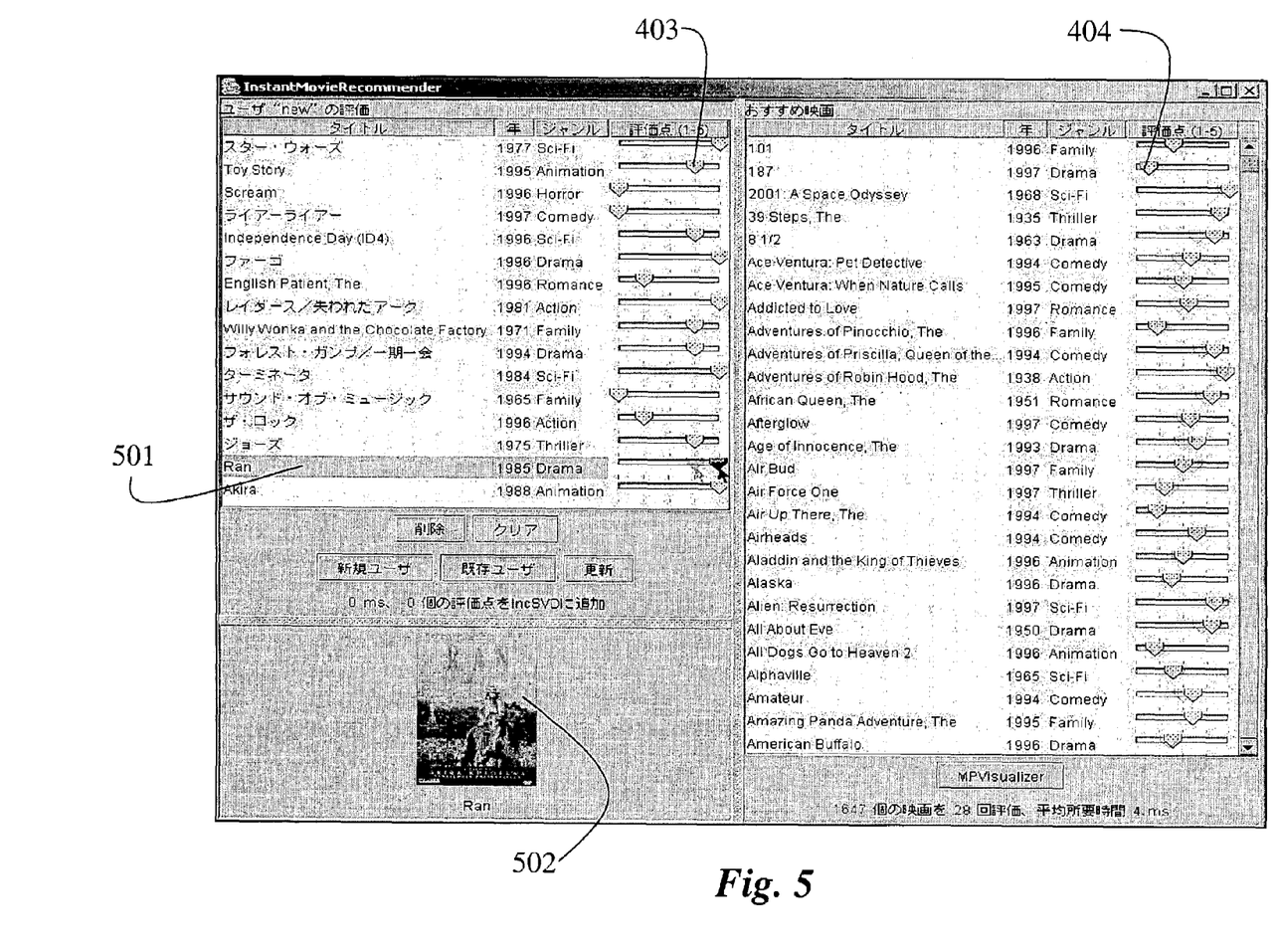
FIG. 5 is a block diagram of a graphical consumer interface for the recommender system of FIG. 2.

The rank-1 update can be used in a full-scale movie recommending system with a graphical consumer interface, as shown in FIG. 5. There, consumers move sliders to rate movies and to see all other movies re-rated and ranked with millisecond response times. The system 200 "learns" from consumers' query ratings, again, in real-time, without ever having to resort to an off-line batch process.

The Thin SVD

Generally, a singular value decomposition factors a matrix X into two orthogonal matrices U and V, and a diagonal matrix $S \doteq \text{diag}(s)$, such that $USV^T = X$, and $U^T X V = S$, where $^T$ represents the matrix transpose. The elements on the diagonal of S are called singular values, and the columns of U and V are called the left and right singular vectors, respectively.

If these matrices are signed and arrange such that the elements s on the diagonal of S are non-negative and in descending order, and the first non-zero element in each column of U is also positive, then the SVD is unique, ignoring any zero singular values.

The SVD has an optimal truncation property. If all but a predetermined number of the r largest singular values and the corresponding singular vectors are discarded, then the product of resulting thinned matrices, $U'S'V' \approx X$, is the best rank-r approximation of X, in the least-squares sense. This is the thin SVD 204. For this reason, the matrix $U'^T X = S'V'^T$, i.e., the projection of X onto r orthogonal axes specified by the columns of U', is an excellent reduced-dimension representation of the incoming ratings 201.

Consumer Taste Space

If X is a tabulation of the consumer-item ratings 201, then the subspace spanned by the columns of U' is interpreted as an r-dimensional consumer taste space. Ratings of individual consumers are located in the test space according to the similarity of their ratings. The relationship between a consumer's ratings, represented as a column vector c, and the corresponding taste-space location p is $c = U'p$, and $p = U'^T c$.

If the column vector c is incomplete, then various imputation methods, described below, can estimate p, and hence a completion of he vector c. This is the basis of my thin SVD-based recommender system 200. I can also identify consumers with similar tastes by their Euclidean distant to the location p in the taste space.

Item Taste Space

Similarly, a item taste space V' contains items arranged by the consumers that like the items. Often, these spaces are useful for subsequent analysis, such as clustering, visualization, market segmentation, and pricing of new items.

The thin SVD 204 is most informative when the data fragments 201 are first translated so that they are centered on the origin of the thin SVD 204. In this case, the thin SVD 204 can be interpreted as a Gaussian covariance model of the ratings that expresses correlations between consumers' tastes, i.e., the ratings 201. Centering allows proper Bayesian inference about typicality and missing values, as well as statistical tests to verify their Gaussianity.

Centering aside, the main practical impediment for using the thin SVD 204 is the cost of determining the thin SVD. State-of-the art methods are typically based on Lanczos or Ritz-Raleigh iterations. Run-time can be linear in the number of non-zero elements in the data. However, those methods require multiple passes through the entire dataset to converge in an batch process, and are not suitable for my on-line system 200.

Sequential SVD updating, according to my invention, focuses on modifying the known SVD of data X to obtain a new SVD of the data with an appended column ([X, c]). Exact, closed-form update rules build a rank-r SVD of a low rank p×q matrix by sequential updates in linear time (O(pqr)) time for the entire matrix, making a single pass through the columns of the matrix. This means that the data need not be stored.

For a p×q matrix X and the desired SVD of minimum rank r, my method updates the entire SVD in O(pqr) time, which is linear with respect to the size of the inputs and outputs, while prior art updating methods are quadratic in the size of the outputs, or must make multiple passes through the data, or they must iterate to convergence.

The method 200 according to my invention contains this as a special case and inherits its very favorable performance. Here, the rules generalize to provide the remaining operations needed for the true on-line system 200 that includes downdating, i.e., removing rows and columns, revising, i.e., changing selected values in a row or column, and recentering.

In the on-line system 200, keeping the SVD 204 centered is an acute problem, because the mean of the data is constantly drifting, partly due to sample variation, and, more importantly, due to statistically significant phenomena such as changing tastes among consumers over time.

Updating the SVD

Updating, downdating, revising, and recentering 210 are all instances of rank-1 updates. Given column vectors a and b, and a known SVD $USV^T=X$ 204, the updating determines the SVD of $X+ab^T$. Typically, b is a binary vector indicating which columns are modified, and a is derived from update or downdate values (c), revision values (d), or a mean value (m), which is subtracted from all columns. These operations are summarized in Table A.

| operation | known | desired | a | $b^T$ |
|---|---|---|---|---|
| update | $US[V^T, 0] = [X, 0]$ | $U'S'V'^T = [X, c]$ | c | $[0, \ldots, 0, 1]$ |
| downdate | $USV^T = [X, c]$ | $U'S'V'^T = X$ | −c | $[0, \ldots, 0, 1]$ |
| revise | $USV^T = [X, c]$ | $U'S'V'^T = [X, d]$ | d − c | $[0, \ldots, 0, 1]$ |
| recenter | $USV^T = X$ | $U'S'V'^T = X - m1^T$ | −m | $1^T = [1, \ldots, 1]$ |

All database operations are expressed as rank-1 modifications of the thin SVD 204, $USV^T=X$, to give the SVD of $U'S'V'^T=X+ab^T$.

Appendix A describes how any such low-rank modification can be solved via operations in the low-dimensional subspaces specified by the known SVD 204. The basic strategy is that the thin SVD 204 is expressed as a product of the old subspaces and a not quite diagonal core matrix, which can be rediagonalized by left and a right rotations. These are small-matrix operations, and thus fast.

Applying the opposite rotations to the old subspaces updates the SVD 204. Even this step can be made fast by accumulating small rotations over many updates instead of applying them to the large subspace matrices. Thus, for my rank-r thin SVD 204, the dominant computations scale in r, which is typically very small relative to the size of the data.

Figure 3:
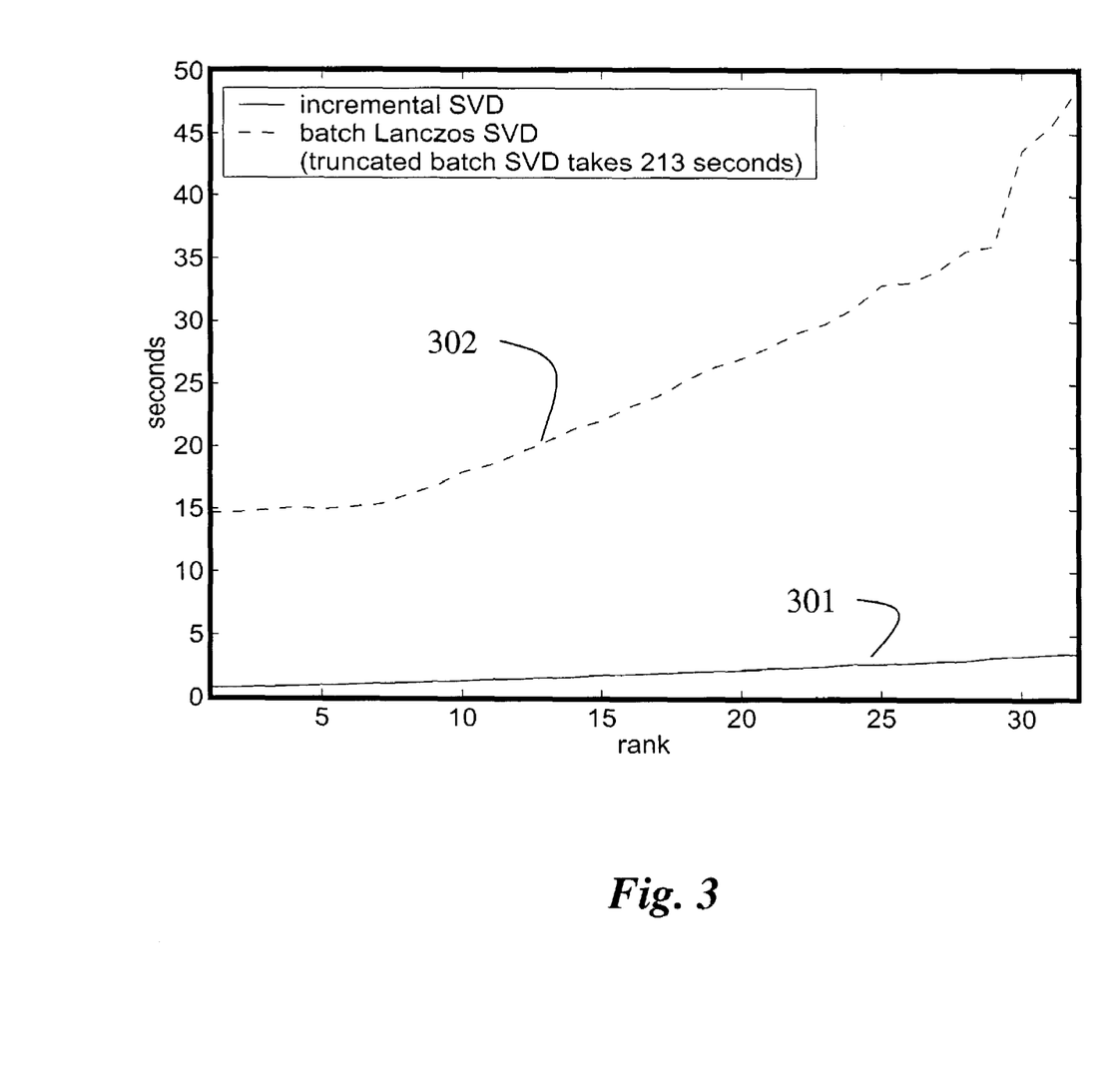
FIG. 3 is a graph comparing updating times for a prior art batch system with and the recommender system of FIG. 2.

As shown in FIG. 3, the special case of the rank-1 rules makes SVD updates 210 fast and simple. FIG. 3 shows the run-time of sequential SVD updating 301 versus prior art batch Lanczos 302, as a function of the number of singular values computed from a random matrix. Each data point represents the average of 100 trials. My updating 210 shows clear linear scaling 301.

Through careful management of the computation, the update rules can build an exact SVD of a p×q rank-r matrix in purely linear O(pqr) time, when the rank is small relative to the size. This is shown in FIG. 3, where an implementation of my method 301 is compared against a prior commercial Lanczos implementation 302.

When the true rank of the underlying matrix is greater than r, my thin SVD 204, necessarily, gives an approximation. Each update increases the rank of the SVD by 1, until a pre-specified ceiling is reached. At this point, the update becomes inexact because the last singular value has to be dropped, giving the optimal fixed-rank approximation. Typically this singular value has a very small value, and the approximation errors cancel out over many updates. In practice, my method can have a numerical accuracy competitive with prior art Lanczos methods.

Because my method is so fast, it can always build a rank-2r model and use the rank-r submodel, which is typically accurate to machine precision. When analyzing elicited responses, such as consumer ratings, the values themselves are notoriously unreliable because consumers show poor repeatability, with ratings wandering up to 40% of the scale from day to day. Therefore, a good low-rank approximation of the data, such as with my system enables, has a higher probability of correct generalization than a medium-rank prior art models that perfectly reconstructs the data.

All of the operations described herein, not just the update, have low computational complexity and work on the pure streaming-data fragments 201, with no storing of the underlying preference matrix, as required in the prior art. Updates require only the current SVD 204, the index of the current consumer or item, and the vector 201 containing the new ratings. Even for underlying matrices with thousands of rows and columns, the updates can keep all data in the CPU's on-board memory cache, making for very fast performance.

Imputation and Prediction

As stated above, ratings tables are typically incomplete. Most entries are unknown. Missing values present a serious problem for prior art processes based on matrix factorizations, because the decompositions are not uniquely defined. Even if a single value is missing, then there is a continuous orbit of unique SVDs that are consistent with the remaining known entries. The imputation problem, i.e., how to predict 220 missing values, plays a key role in determining the SVD 204 and in making the recommendations 203.

Most prior art SVDs first perform a small SVD of a submatrix that is dense, second regress against the SVD to impute missing values in some adjoining part of the submatrix, third perform a larger SVD of the dense and imputed value, and fourth repeat until all missing values are filled in.

Those methods have quadratic complexity, and the result is very sensitive to the choice of regression method and order of imputations. Other methods are based upon an expectation-maximization process, and have similar complexity and sensitivity to initial conditions. Approximation theory teaches that when learning in an on-line setting with a finite memory, some sensitivity to data ordering is unavoidable.

The strategy to minimize this sensitivity during my sequential updating is to select updates that have a highest probability of correctly generalizing, usually by controlling the complexity of the SVD while maximizing the probability of the data.

My system exploits the fact that the singular values and left singular vectors comprise an EVD of the data's covariance matrix. Under the fairly weak assumption that the data are normally but anisotropically distributed, the SVD 204 can be interpreted as a model of the data density, and the SVD updating is a sequential updating of that density.

Adding a complete vector is equivalent to updating the density with a point. Adding an incomplete vector 201 is equivalent to updating the density with a subspace whose axes correspond to the unknown elements of the vector. If the SVD is thin, then the predicted value can be further constrained to lie in the intersection of the data and missing value subspaces.

Naïve imputation schemes, such as linear regression, select the point in the missing value subspace or intersection subspace that is closest to the origin, essentially assuming that some unknowns are zero-valued. Such imputations are not likely to be true, and generally reduce the predictivity of those models when incorporated into the SVD.

Clearly, imputation requires some prior or learned knowledge. In Appendix B, I describe a fast imputative update for use when values in a ratings vector c are unknown, but assumed to lie within a known range. This is commonplace in ratings data.

I provide the imputation with the density of previously processed data. If one considers all points in the intersection subspace according to their likelihood, vis-à-vis the data density with a uniform prior probability, then the posterior probability mean estimate of the missing values is given by selecting the point that lies the fewest standard deviations from the origin.

Appendix C describes how this probabilistic imputation is determined. For SVD updating, the full imputation of the missing data elements is not needed. The subspace coordinates of the imputed point are sufficient. My imputation greedily minimizes the growth of the rank of the SVD, thus reducing the complexity of the model. This imputation gives very good results in tasks, such the recommender system 200.

The imputed ordinates are essentially predictions of how a consumer would rank all items, determined as a linear mix of the ratings of all other consumers, weighted by the correlations between their ratings and the few known ratings of the current consumer.

However, there is a potential problem with density-based imputation. In very rare cases, when the intersection space is very far from the origin, a large but improbable vector could be added to the SVD 204. If it is known a priori that such vectors are impossible, i.e., the values are restricted to a small range, then such constraints can often be expressed as a Gaussian prior probability and a maximum a posterior probability imputation made via least-squares methods.

In the context of the thin SVD 204, this is equivalent to assuming that all of the truncated singular values have a very small predetermined value $\epsilon$, instead of zero value. This is equivalent to a Bayesian formulation of principal component analysis. As a result, the imputed vector is smaller but could lie slightly outside the taste space. I can accommodate this by either an exact rank increasing update, or an approximate fixed-rank update.

Bootstrapping the SVD

The more "mass" in the singular values, the more constrained the imputation is by previous inputs, and therefore the better the estimated SVD. This poses a problem in the beginning, when my thin SVD 204 has almost no scores because only a few consumers have rated a few items.

In practical applications, consumers typically rate less than 1% of all items, so there is little chance than any item has been rated by more than one consumer until the system has been used for a while.

An optional way to work around this problem is to store the first few hundred submitted ratings 201 in a temporary matrix, and then to re-order the ratings so that they are dense in one corner of the matrix. Sorting the ratings can do this. The SVD 204 can "grow" out of this corner by sequential the updating 210 with the fragments of rows and columns 201.

When it finally becomes necessary to predict values, i.e., the method has no more complete rows and columns, these imputations are reasonably well constrained. My scheme defers imputations until they can be well constrained by previously incorporated data. It also enables factoring of extremely sparse preference matrices.

Results

Results for collaborative filtering an extremely sparse array of consumer-item scores and determines predictions of the missing scores are now compared.

Sarwar et al. collected a 93.7% empty matrix containing ratings of 1650 movies on a 1-5 scale by 943 consumers, see "Application of dimensionality reduction in recommender system—a case study," *ACM WebKDD* 2000 *Web Mining for Ecommerce Workshop*. ACM Press, 2000. Those scores were split 80%-20% into training and testing sets. They filled missing elements in the training matrix with the average rating for each movie, centered the matrix, and then computed a series of thin, sparse Lanczos SVDs. They found that a rank-14 basis best predicted the test set as measured by mean absolute error (MAE), and mean squared error.

Figure 4:
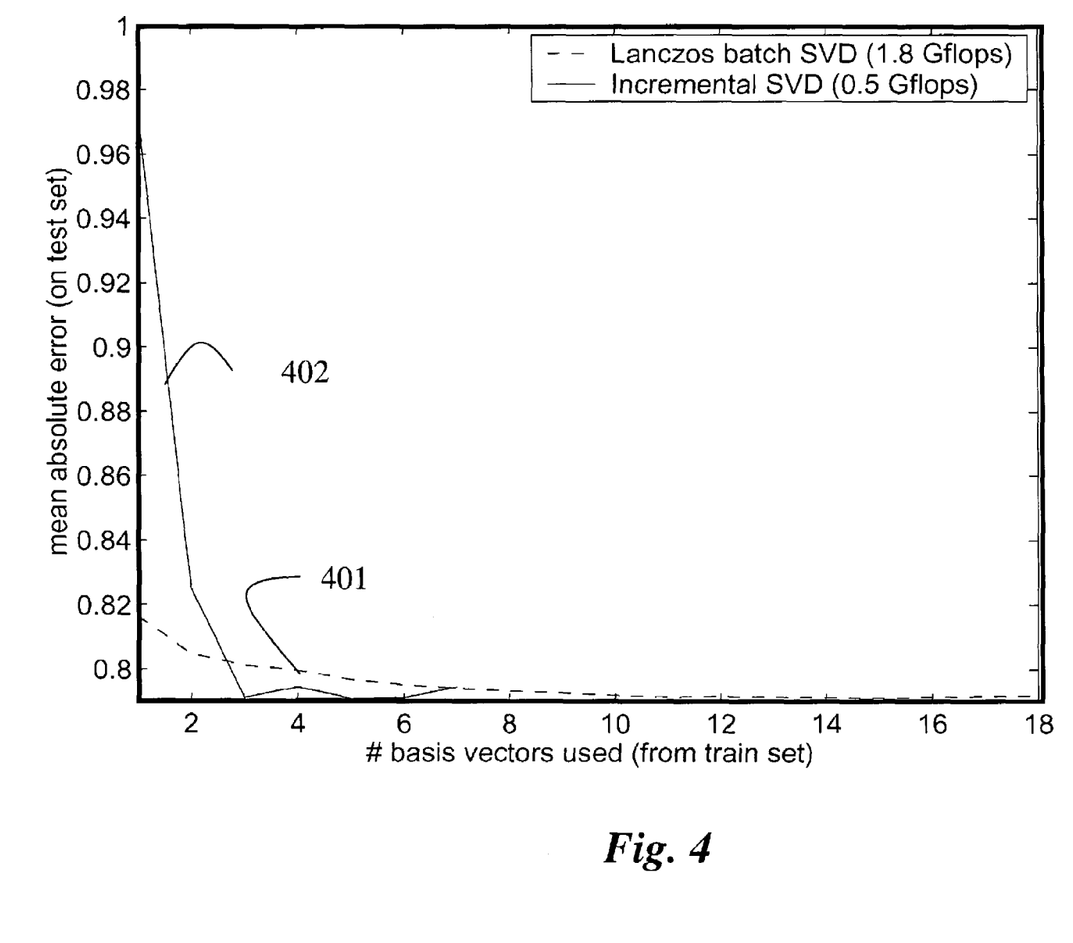
FIG. 4 is a graph comparing prediction errors for a prior art batch system with the recommender system of FIG. 2.

As shown in FIG. 4, when the Sarwar matrix was reprocessed in a similar manner with a Lanczos SVD, a rank-15 basis gave better results 401, with an MAE of 0.7914 and a standard deviation (SD). The difference could be due to a different splitting of the training and testing sets.

Then, the incremental imputative SVD according to the invention was applied to the raw training dataset. The method according to the invention found a 5-dimensional subspace that had an even better prediction accuracy 402 of 0.7910 MAE, 1.0811 SD. In each of 5 disjoint train/test splits, the incremental method produced a compact 4- or 5-dimensional basis that predicted at least as well as the best, but much larger Lanczos-derived basis.

My scores are competitive with published reports of the performance of nearest neighbor based systems on the same data set. However, my method uses much less storage, and offers fast updating and predictions. Surprisingly, the incremental SVD according to the invention indicates that the five largest singular values account for most of the variance in the data.

In all trials the resulting predictor is within 1 rating point of the true value more than 80% of the time, and within 2 rating points more than 99% of the time. This is probably more than accurate enough, as consumers often exhibit day-to-day inconsistencies of 1 to 2 points when asked to rate the same movies on different days. My incremental method also has the practical advantages of being faster, requiring only 0.5 gigaflops versus 1.8 gigaflops for the Lanczos batch method.

The invention enables on-line updating of the SVD as new movies or viewers are added to the matrix. Prior art collaborative filtering systems typically require large overnight batch processing to incorporate new data.

Instant Recommender

Because the SVD basis is small and the computational load is light, a practical real-time collaborative filtering system can be constructed using Java, shown in FIG. 5. A Japanese version is shown.

To query the system, a consumer selects a small number of movies by "dragging" their titles 501 into a rating panel 502, where each can be rated by moving a slider 503 along a sliding scale. Predicted ratings of all the other movies and a sorted list of recommendations are updated and displayed in real-time. As the slider 503 moves, sliders 504 next to all other movie titles move. It takes an average of 6 milliseconds to re-rate all movies, so the feedback is real-time.

One advantage of instant visual feedback is that a consumer can see how strongly the predicted rating of any movie is correlated or anti-correlated with that of the movie whose rating is currently being varied by the consumer.

Second, if the system makes a prediction with which the consumer disagrees, the consumer can drag that movie into the rating panel and correct the system. After a few of such iterations, my system quickly yields an over-constrained estimate of the consumer's location in taste space, leading to improved recommendations and a more informative ratings vector to be incorporated into the SVD.

When the consumer is done, the current ratings are used to update the SVD basis. The consumer can also obtain a persistent identifier so that he or she may revisit, revise, or remove ratings at any time.

Distributed Collaborative Filtering

In one implementation, the system 200 can combine the updating and recommending in a stand alone Java application. Updates take an average of 50 milliseconds. As a real-time, interactive application, the method according to the invention can execute on a distributed client computer, instead of on a centralized server as in the prior art, while the basis is constantly updated. Adding new movies and consumers grows the basis.

Figure 6:
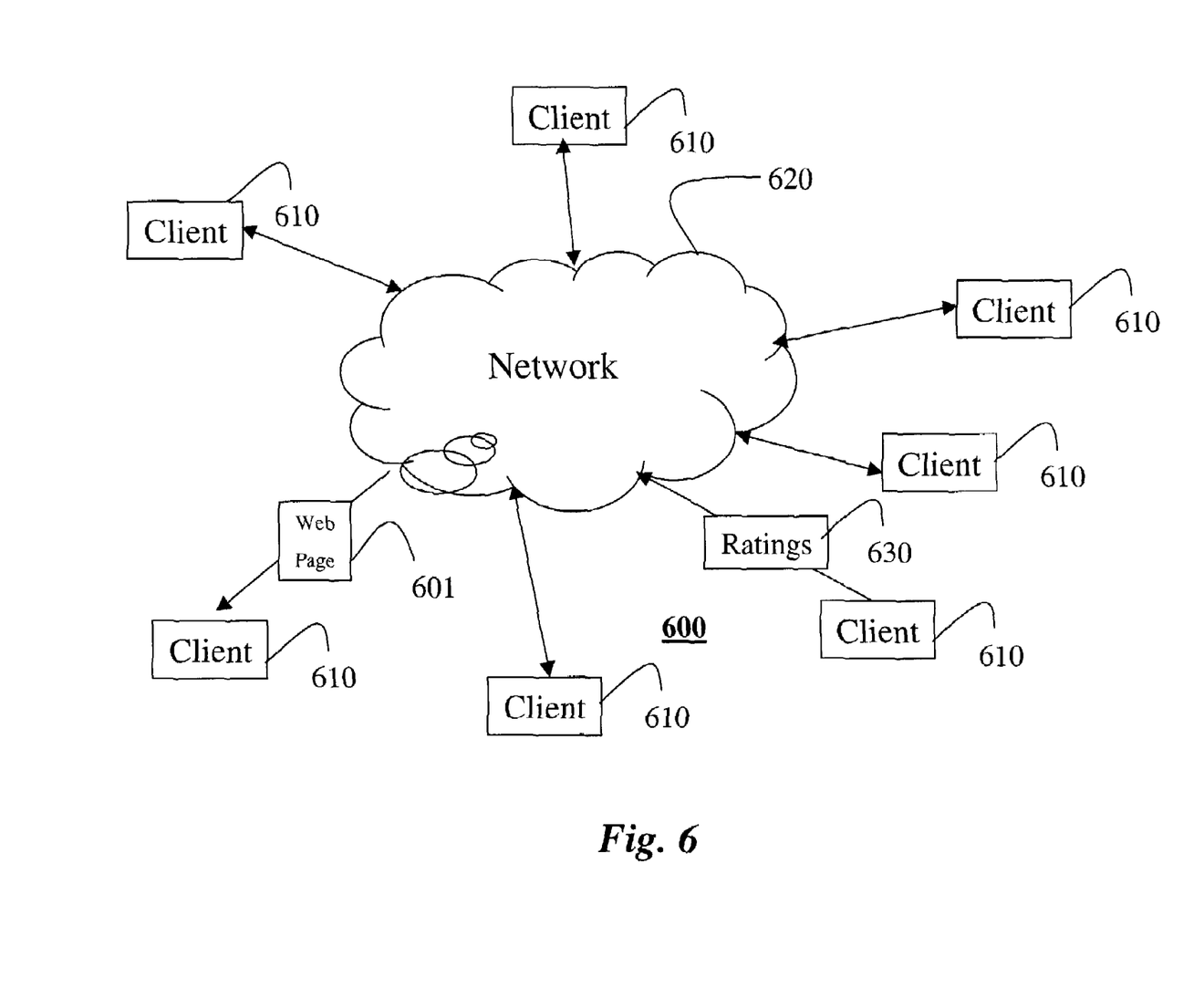
FIG. 6 is a block diagram of an on-line decentralized recommender system.

As shown in FIG. 6, the recommender system 200 can be downloaded as Java script web page 601 into web-served clients 610 connected via a network 620, e.g., the Internet. Instead of using a central server to update the basis, as in the prior art, ratings 630 are distributed to other client computers, and each client can perform autonomous updates. Thus, the invention enables a true collaborative filtering system 700 that is totally decentralized.

Effect of the Invention

The invention provides a family of rank-1 SVD revision rules that efficiently enable a "thin" SVD to "mimic" database operations on what otherwise be an underlying matrix of consumer-item scores. These operations include adding, retracing, and revising rows, columns, and fragments thereof.

In addition, the SVD can be recentered as the mean of the data stream drifts. The interpreted operations are fast with minimal storage requirements. The method is fast enough to execute as a real-time graphical interaction with a model of communal tastes in stand-alone or distributed systems.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

Appendix A

A Low-Rank Modifications

Let U diag(s)

$$V^T \underline{SVD_r} X$$

with $U^T U = V^T V = I$ be a rank-r thin singular value decomposition (SVD) of matrix $X \in R^{p \times q}$. This appendix shows how to update U, s, V to the SVD of $X + AB^T$, where A, B have c columns. The original matrix X is not needed. Efficient rank-1 updates allow single columns (or rows) of X to be revised or deleted without the entire V (resp. U) matrix.

Let P be an orthogonal basis of $(I-UU^T)A = A-UU^T A$, the component of A orthogonal to U, as one would obtain from the QR-decomposition $$[U, P]\begin{bmatrix} I & U^T A \\ 0 & R_A \end{bmatrix} \overset{QR}{\Leftarrow} [U, A], \quad (1.1)$$

which can computed via the modified Gram-Schmidt procedure (MGS) [9, §5.2.8]. $R_A$ is upper-triangular. Similarly, let Q be an orthogonal basis of $B-VV^T B$. Then $$[U, P]^T (X + AB^T)[V, Q] = \quad (1.2)$$

$$\begin{bmatrix} \text{diag}(s) & 0 \\ 0 & 0 \end{bmatrix} + [U, P]^T A B^T [V, Q] = \quad (1.3)$$

$$\begin{bmatrix} \text{diag}(s) & 0 \\ 0 & 0 \end{bmatrix} + \begin{bmatrix} U^T A \\ R_A \end{bmatrix}\begin{bmatrix} V^T B \\ R_B \end{bmatrix}^T. \quad (1.4)$$

The goal is to rediagonalize equation (1.4). Let $U' \text{diag}(s') V'^T$ be the rank-(r+c) SVD of the right-hand side (RHS) of equation (1.4). Then the rank-r+c update of the rank-r SVD is $$U'' \text{diag}(s'') V''^T \doteq ([U, P]U') \text{diag}(s') ([V, Q]V')^T \quad (1.5)$$

$$= (X + AB^T). \quad (1.6)$$

Note that one never needs the original data matrix X.

A.1 Rank-1 modifications Rank-1 updates offer special efficiencies: For the updated SVD of $X + ab^T$, expand the MGS of equation (1.1) to obtain $m \doteq U^T a$; $p \doteq a - Um$; $p \doteq \sqrt{p^T p} = \sqrt{a^T p}$; $P = p/p$ and similarly $n \doteq V^T b$; $q \doteq b - Vn$; $q \doteq \sqrt{q^T q} = \sqrt{b^T q}$; $Q = q/q$. The rightmost term in equation (1.4) is then the outer vector product $$\begin{bmatrix} U^T A \\ R_A \end{bmatrix} \begin{bmatrix} V^T B \\ R_B \end{bmatrix}^T = \begin{bmatrix} m \\ p \end{bmatrix} \begin{bmatrix} n \\ q \end{bmatrix}^T. \quad (1.7)$$

For example, if one wanted to change the first column of X to y, then $b=[1,0,0,\ldots]^T$; $n^T$ is the first row of V; $a=y-U\mathrm{diag}(s)n$ is y minus the first column of X; $m=U^T y - \mathrm{diag}(s)n$; $p' \doteq y - U(U^T y)$, etc. To append a column y to the SVD, append a zero column to the original SVD by appending row of zeros to V, then update that column to y. In this case $n=0$ and $q=1$, so equation 1.4 asks us only to rediagonalize the broken-arrow matrix $$\begin{bmatrix} \mathrm{diag}(s) & m \\ 0 & p \end{bmatrix}, \quad (1.8)$$

which can be done in $O(r^2)$ time [10].

Setting $y=0$ effectively downdates the SVD by zeroing the column selected by b. In this case RHS equation (1.4) simplifies to $$\begin{bmatrix} \mathrm{diag}(s) & 0 \\ 0 & 0 \end{bmatrix} + \begin{bmatrix} U^T A \\ R_A \end{bmatrix} \begin{bmatrix} V^T B \\ R_B \end{bmatrix}^T = \quad (1.9)$$

$$\begin{bmatrix} \mathrm{diag}(s) & 0 \\ 0 & 0 \end{bmatrix} \left( 1 - \begin{bmatrix} n \\ 0 \end{bmatrix} \begin{bmatrix} n \\ \sqrt{1-n^T n} \end{bmatrix}^T \right). \quad (1.10)$$

P is unused, and $Q=(b-Vn)/\sqrt{1-n^T n}$ is used only if updating V. Note that downdating the $i^{th}$ column only requires knowing the $i^{th}$ row of V.

The special structure and near diagonality of RHS equations (1.4-1.10) license additional numerical efficiencies. For example, let J equal RHS equation (1.10). Then $JJ^T = \mathrm{diag}(s)^2 - (\mathrm{diag}(s)n)(\mathrm{diag}(s)n)^T$ is a symmetric diagonal-plus-rank-1 matrix. for such matrices it is known [18, 9, section 8.5.3] that the eigenvalues—$\mathrm{diag}(s')^2$—can be found quickly via Newton iterations for the roots of $$f(s_i'^2) = 1 - \sum_j \frac{s_j n_j}{s_j^2 - s_i'^2},$$

while the eigenvectors $$\begin{bmatrix} U' & 0 \\ 0 & 1 \end{bmatrix}$$

are proportional to $(\mathrm{diag}(s)^2 - s_i'^2 I)^{-1} n$. Equation (1.7) leads to a diagonal-plus-rank-2 symmetric eigenproblem, requiring more sophisticated solution methods.

A.2 Controlling complexity If done naively, equation 1.1 takes $O(p(r+c)^2)$ time, the rediagonalization takes $O((r+c)^3)$ time, and the updates of the subspaces in equation 1.6 takes $O((p+q)(c+r)^2)$ time. In the setting of a rank-1 update of a fixed-rank SVD, these times can be reduced to $O(pr)$, $O(r^2)$, and $O(r^3)$, respectively, by expanding the MGS, performing a sparse diagonalization, and using the following trick: Instead of performing the large multiplications $U''=[U,p]U'$, $V''=[V,q]V'$ prescribed by equation 1.6, we leave the SVD decomposed into 5 matrices $$U_{p \times r} \cdot U'_{r \times r} \cdot S_{r \times r} \cdot V'^T_{r \times r} \cdot V^T_{r \times q} \quad (1.11)$$

and only update the smaller interior matrices U', V'. In the case where a is contained in the subspace of U and similarly $b \in V$, p and q can be ignored and the update is exact. Otherwise the information in p and q can be expressed as appends to U and V [3, appendix], or discarded under a fixed-rank approximation. As mentioned above, it can be shown [3] that for low-rank matrices ($r \sim O(\sqrt{p})$) the entire SVD can be computed in a series of updates totaling $O(pqr)$ time.

Appendix B

Consider a nonzero rectangular volume V of possible updates specified by opposite corners y and z. Let $z_i$ be the $i^{th}$ element of z. Assuming a uniform measure in this space, the volume's second moment is $$\sum_\nu \doteq \mathrm{cov}(\nu) = \left( \int_{x \in \nu} xx^T dx \right) \bigg/ \left( \int_{x \in \nu} 1 \, dx \right),$$

where the normalizing quotient is $\Pi_{i | z_i \neq y_i} |z_i - y_i|$. Here the origin is taken to be the data mean so equation (2.12) is interpreted as a covariance. Any dimension in which $y_i = -z_i$ can be dropped (drop element $y_i$ from y and similarly for $z_i$); symmetric bounds are uninformative, forcing the imputed value in that dimension to be 0. Similarly, drop dimensions for which $y_i = z_i$; no imputation is needed. Expanding the integrals, we find that diagonal elements of $\Sigma_V$ are $(y_i^2 + y_i z_i + z_i^2)/3$ and off-diagonal elements are $(y_i + z_i)(y_j + z_j)/4$, or $$\Sigma_V = (y+z)(y+z)^T/4 + \mathrm{diag}(w)/12, \quad (2.13)$$

where $w_i \doteq (y_i - z_i)^2$. This is a $k \times k$ diagonal-plus-rank-1 matrix where k is the number of dimensions in which $y_i \neq \pm z_i$. $\Sigma_V$ has EVD $W \Lambda W^T = \Sigma_V$ that can be computed in $O(k^2)$ time directly from the vectors $y+z$, $y-z$, using the Newton method mentioned above. Updating the SVD $USV^T = X$ with k vectors whose missing values are set to the columns of $W\Lambda^{1/2}$ will duplicate the second-order statistics of $X \cup V$, and therefore completes the imputative update. E.g., it is equivalent to updating the SVD with n i.i.d. samples from V, each scaled by $\sqrt{n}$ as $n \to \infty$. A single update using just the column of $W\Lambda^{1/2}$ with the largest norm will give the best single-vector approximation of the imputation.

This approach becomes more powerful when the uniform measure dx in equation (2.12) is replaced with a more informative measure, e.g., the running estimate of data density $dN(x|0, \Sigma)$ discussed below. The integrals are solvable in closed form. If $\Sigma$ is a dense (nondiagonal) covariance, even symmetric bounds become informative.

Appendix C

Probabilistic imputation Consider adding a vector c with missing values. Partition into $c_\bullet$ and $c_o$, vectors of the known and unknown values in c, respectively, and let $U_\bullet$, $U_o$ be the corresponding rows of U. Imputation of the missing values via the normal equation $$\hat{c}_\circ \leftarrow U_\circ \, \mathrm{diag}(s)(\mathrm{diag}(s)\, U_\bullet^T U_\bullet \, \mathrm{diag}(s))^+ (\mathrm{diag}(s) U_\bullet^T c_\bullet) \quad (2.14)$$
$$= U_\circ \, \mathrm{diag}(s)(U_\bullet \, \mathrm{diag}(s))^+ c_\bullet,$$

yields the completed vector ĉ that lies the fewest standard deviations from the density of the (centered) data, as modelled by a Gaussian density $N(x|0, \Sigma)$, where $\Sigma \doteq U_\bullet^T \mathrm{diag}(s) U_\bullet$ is a low-rank approximation of the covariance of the data seen thus far ($X^+$ denotes Moore-Penrose pseudo-inverse). Substituting equation 2.14 into equation 1.8 yields $$\begin{bmatrix} \mathrm{diag}(s) & U^T \hat{c} \\ 0 & p \end{bmatrix} = \quad (2.15)$$

$$\begin{bmatrix} \mathrm{diag}(s) & \mathrm{diag}(s)(U_\bullet \mathrm{diag}(s))^+ c_\bullet \\ 0 & \|c_\bullet - U_\bullet \mathrm{diag}(s)(U_\bullet \mathrm{diag}(s))^+ c_\bullet)\| \end{bmatrix}, \quad (2.16)$$

where $U^T \hat{c}$ is the projection of the imputed vector onto the left singular vectors and p is the distance of the vector to that subspace. As one might expect, with missing data it rarely happens that p>0.

I claim:

1. A computer implemented method for recommending items to consumers in a recommender system, comprising the steps of:
    receiving a stream of rating on items from consumers via a network;
    updating sequentially, by a computer, a singular value decomposition of a preference matrix using the stream of ratings, in which each rating is processed one at a time and independent of any other ratings, while receiving the ratings, and wherein the updating is a sequential rank-1 update of the singular value decomposition to produce a thin SVD, and wherein the preference matrix is X, and wherein the singular value decomposition factors the preference matrix X into two orthogonal matrices U and V, and a diagonal matrix $S \doteq \mathrm{diag}(s)$, such that $USV^T = X$, and $U^T X V = S$, where $^T$ represents the SVD transform, the elements of s are singular values and columns of U and V are left and right singular vectors, respectively, and further comprising:
        arranging non-negative elements on the diagonal of S in descending order, and a first non-zero element in each column of U is positive so that the thin SVD is unique; and
        discarding all but a predetermined number of the r largest singular values and the corresponding singular vectors so that a product of the resulting thinned matrices, $U'S'V'^T \approx X$, is a best rank-r approximation of X in a least-squares sense, and a matrix $U'^T X = S'V'^T$;
    predicting recommendations of particular items for a particular consumer based on the updated singular value decomposition while receiving the ratings and updating the singular value decomposition; and
    displaying the recommendations for the particular consumer on a graphical consumer interface via the network.

2. The method of claim 1 further comprising:
    receiving the stream of ratings asynchronously in a random order.

3. The method of claim 1 wherein the updating further comprises:
    adding, changing, and retracting the ratings from the singular value decomposition of the preference matrix.

4. The method of claim 1 further comprising:
    discarding the ratings after the updating so that a size, structure, and content of the underlying preference matrix is unknown.

5. The method of claim 1 wherein a projection of X onto r orthogonal axes, specified by the columns of U' is a reduce-dimension representation of the ratings.

6. The method of claim 5 wherein the preference matrix X represents a tabulation of the ratings, an a subspace spanned by the columns of U' is interpreted as an r-dimensional consumer taste space.

7. The method of claim 6 wherein individual consumers are located in the taste space according to a similarity of their ratings, and a relationship between the ratings of the particular consumer is represented as a column vector c, and a corresponding taste-space location p is c=U'p, and p=U'$^T$c.

8. The method of claim 6 wherein a product taste space is the vector V', and the taste space contains items arranged according to the consumers.

9. The method of claim 1 further comprising:
    translating the ratings to center the ratings on an origin of the singular value decomposition.

10. The method of claim 9 further comprising:
    interpreting singular value decomposition as a Gaussian covariance model of the ratings that express correlations between the ratings of the consumers.

11. The method of claim 1 where for column vectors a and b, and the thin SVD $USV^T = X$, the updating determines the singular value decomposition of $X+ab^T$, where column b is a binary vector indicating which columns are updated, and column a is derived from the ratings.

12. The method of claim 1 wherein all truncated singular values have a small predetermined threshold value ε.

13. The method of claim 1 further comprising:
    displaying the recommendation in real-time on the graphical consumer interface while receiving and updating.

14. The method of claim 1 wherein the receiving, updating, and predicting are executed in a client computer.

15. The method of claim 14 further comprising:
    executing the receiving, updating, and predicting in a plurality of client computers connected via a network to enable a distributed and decentralized recommender system.

16. The method of claim 1 wherein the receiving, updating and predicting are all performed on-line, and in real-time.

* * * * *